United States Patent [19]

Knorreck et al.

[11] Patent Number: 4,498,499

[45] Date of Patent: Feb. 12, 1985

[54] VALVE FOR GASEOUS AND/OR LIQUID FLOW MEDIA

[75] Inventors: Peter Knorreck, Weissach; Wolfgang Kühne, Stuttgart; Norbert Müller, Tamm, all of Fed. Rep. of Germany

[73] Assignee: Robert Bosch GmbH, Stuttgart, Fed. Rep. of Germany

[21] Appl. No.: 493,472

[22] Filed: May 11, 1983

[30] Foreign Application Priority Data

Jul. 15, 1982 [DE] Fed. Rep. of Germany ....... 3226409

[51] Int. Cl.³ ............................................. F16K 11/16

[52] U.S. Cl. .............................. 137/627.5; 137/513.5; 137/DIG. 8

[58] Field of Search ............... 137/513.5, 627.5, 116.5, 137/DIG. 8; 123/568

[56] References Cited

U.S. PATENT DOCUMENTS 3,931,830 1/1976 Gritz ............................ 137/513.5 X
4,166,476 9/1979 Yamanaka .................... 137/627.5 X
4,337,798 7/1982 Zettergren ....................... 137/627.5

*Primary Examiner*—Robert G. Nilson
*Attorney, Agent, or Firm*—Edwin E. Greigg

[57] ABSTRACT

A valve is disclosed for gaseous and/or liquid flow media, in particular a pressure control valve for an exhaust recirculation valve in injection systems in motor vehicles. For the sake of attaining an extremely small opening hysteresis, this valve has a leakage point which is effective between the contact faces of the valve closing member and the valve seat. The suction flow brought about by the leakage point generates a film of flow medium between the contact faces which prevents the complete closure of the valve at a static point on the characteristic valve curve.

2 Claims, 1 Drawing Figure

VALVE FOR GASEOUS AND/OR LIQUID FLOW MEDIA

BACKGROUND OF THE INVENTION

The invention is based on a valve for gaseous and/or liquid flow media, in particular a pressure control valve for an exhaust recirculation valve in internal combustion engines.

In a known pressure control valve for controlling an exhaust recirculation valve in an internal combustion engine, the delivery opening communicates with the vacuum chamber of the exhaust recirculation valve, with which the quantity of exhaust gas delivered to the fuel-air mixture in the intake tube is regulated. For controlling the vacuum in the valve interior in accordance with the operating status of the motor vehicle engine, the valve opening of the pressure control valve communicates with a source of vacuum via a vacuum line, and the valve closing member is actuated counter to the force of a valve opening spring by a differential pressure transducer disposed in the fuel supply line. If a larger quantity of fuel is injected by the fuel injection pump, for instance, during an acceleration of the motor vehicle, then the pressure drop in the differential pressure transducer increases as a result. The differential pressure transducer accordingly actuates the valve closing member in the closing direction, causing the vacuum from the vacuum source to be less effective in the valve interior. The valve interior is simultaneously relieved via a throttle. As the vacuum in the valve interior lessens i.e. as the actual pressure increases approaching atmospheric pressure, the exhaust recirculation valve is closed to an increasing extent by a closing spring, so that there is a lower rate of exhaust feedback to the intake tube. In the closed position of the pressure control valve, the valve closing member rests on the valve seat surrounding the valve opening and seals off the valve opening completely.

As the fuel injection quantity is reduced, a greater quantity of exhaust gas has to be supplied. The thereby lessening vacuum in the differential pressure transducer thus causes the pressure control valve to open once again. However, the pressure control valve does have a certain hysteresis in opening; that is, as the opening process is initiated, a certain opening force must first be brought to bear before the valve closing member will rise from the valve seat. This hysteresis in opening is a critical disturbing factor in regulating the delivery of the metered exhaust gas rate.

OBJECT AND SUMMARY OF THE INVENTION

The valve according to the invention has the advantage over the prior art that the opening hysteresis is eliminated, except for a negligibly small remnant hysteresis. In the valve closing position, the intake pressure applied to the vacuum line generates suction flow, past the contact faces of the valve seat and the valve closing member and generates an air film between the contact faces. The air film prevents the complete closure of the valve at a static point of the valve opening-and-closing characteristic, thus preventing the valve closing member from adhering to the valve seat. A supplementary exertion of force is therefore not required for opening the valve.

More particularly, the opening hysteresis of a double-acting plate valve of the type embodying the present invention orients itself on the one hand to the pressure difference between the valve interior and the ambient air and on the other hand to the pressure difference between the vacuum line pressure and the ambient air, as well as to the initial stress of the valve closing spring of the ventilation valve. By the intentional provision of leakage according to the invention, both the opening hysteresis of the vacuum valve between the valve interior and the vacuum line and the opening hysteresis of the ventilation valve between the valve interior and the ambient air are decisively lessened. The air film according to the invention forms both between the contact faces of the valve plate and the vacuum line on the one hand and also between the valve plate and a further valve seat, which surrounds the valve opening leading to the atmosphere, on the other and prevents the complete closure of both the vacuum valve and the ventilation valve at a static point on the characteristic valve curves.

The invention will be better understood and further objects and advantages thereof will become more apparent from the ensuing detailed description of a preferred embodiment taken in conjunction with the drawing.

DESCRIPTION OF THE PREFERRED EMBODIMENT

Figures 1, 2:
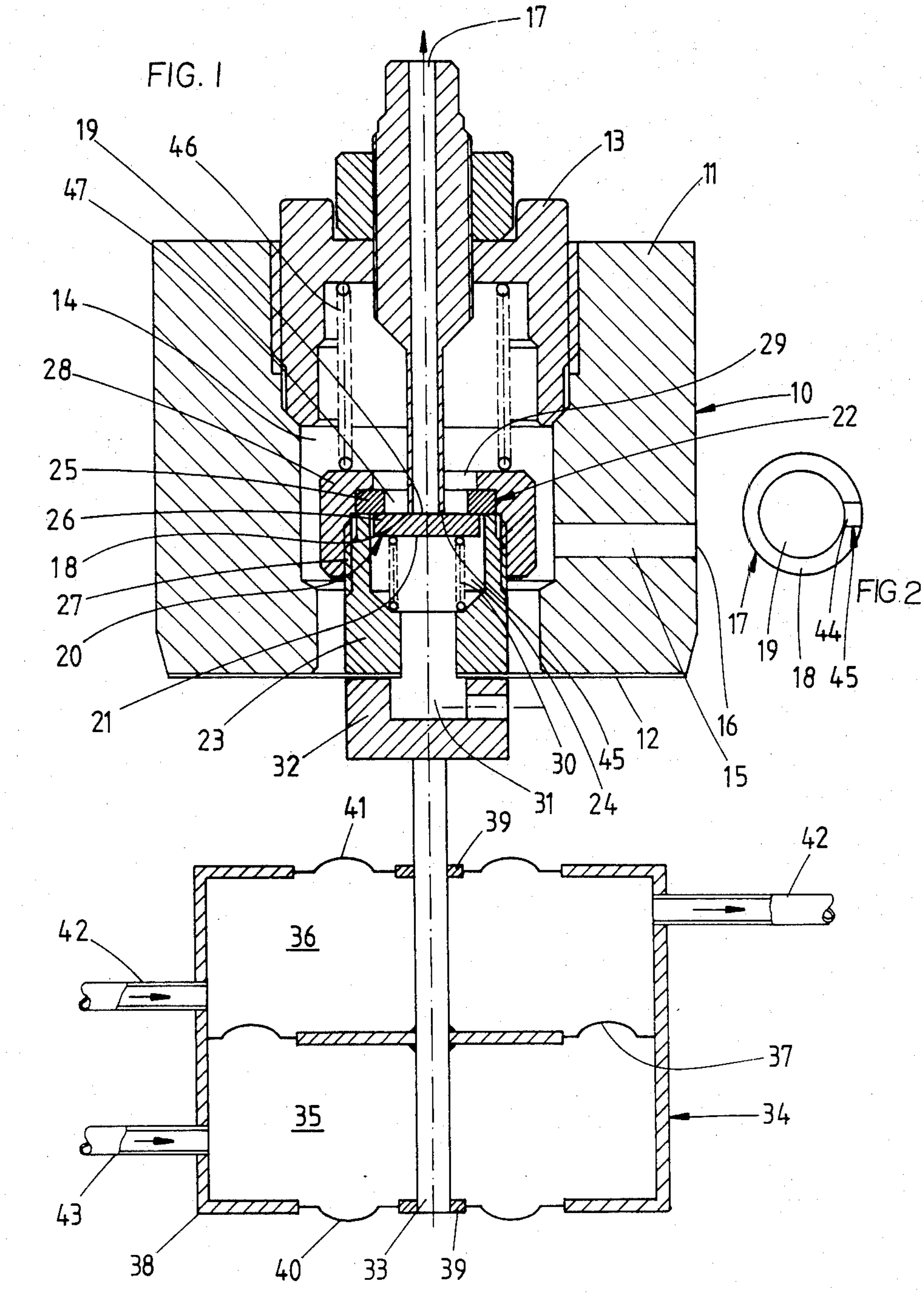
FIG. 1 of the drawing is a longitudinal section through a pressure control valve according to the invention, intended for controlling an exhaust recirculation valve in an injection system of a motor vehicle, and having a schematically shown differential pressure transducer.
FIG. 2 is an end view of a vacuum line that forms a valve and illustrates a leakage groove.

The pressure control valve 10 shown in the drawing is described, in terms of its disposition in the regulating loop of a fuel supply system for an internal combustion engine, in German Offenlegungsschrift No. 29 49 507. The pressure control valve 10 has a hollow-cylindrical housing 11, the bore of which is closed off at one end by a diaphragm 12 and at the other end by a closure cap 13 screwed into the inner wall of the housing 11 and forms in combination with the hollow-cylindrical housing the valve interior 14. A radial bore 15 passing through the wall of the housing connects a valve delivery opening 16 with the valve interior 14. The valve delivery opening 16 communicates—as described fully in the above-cited German Offenlegungsschrift but not shown here—with the vacuum chamber of an exhaust recirculation valve, by means of which the quantity of exhaust gas delivered to the intake tube of the engine is established.

The free end of a vacuum line 17, connected to a vacuum source not shown here, is carried through the valve closure cap 13 and discharges into the valve interior 14. The end face of the free end of the vacuum line 17 forms the valve seat 18, which surrounds the valve opening 19 embodied by the inside diameter of the free end. The valve seat 18 and the valve opening 19 cooperate with a valve closing member 20, which is embodied as a valve plate 21 and simultaneously is part of a ventilation valve 22.

The ventilation valve 22 is integrated with a displacement piston 23 which is movable within the valve interior 14, and a blind bore 24 extends from the end face of the displacement piston 23 into the interior. An annular disc 25 which partially covers the blind bore 24 is mounted on the end face and embodies a further valve seat 26 for the valve plate 21. The annular disc 25 is secured to the end face of the displacement piston 23 with a sleeve nut 28 screwed onto an outer thread 27 of the displacement piston 23. The sleeve nut 28 has a central bore 29, through which the vacuum line 17 protrudes, coaxially with the sleeve nut 28 and the annular disc 25, as far as the valve plate 21. Thus a further valve opening 47 is formed between the annular disc 25 and the vacuum line 17. A valve closing spring 30 is supported at one end on the side of the valve plate 21 remote from the further valve seat 25 and at the other end on the bottom of the blind bore 24. The blind bore 24 communicates with the atmosphere via a ventilation conduit 31.

At one end, a valve opening spring 46 having a very much greater restoring force as compared with the valve closing spring 30 is supported on the displacement piston 23 and on the opposing inner wall of the valve interior 14; this valve opening spring 46 urges the displacement piston 23 such as to lift the valve plate 21 from the valve opening 19. On the other end, the displacement piston 23 is actuated by a differential pressure transducer 34. To this end the displacement piston 23, on its end face opposite the end face carrying the blind bore, is screwed together with a fastening plate 32 of an actuation push rod 33. The diaphragm 12 is thereby fastened between the end face of the displacement piston 23 and the fastening plate 32. The diaphragm 12 has a central recess for the passage therethrough of the ventilation conduit 31. The actuation push rod 33 is part of a differential pressure transducer 34, which is disposed in the fuel supply line between the fuel pump and the fuel injection pump. The structure and mode of operation of the differential pressure transducer 34 are fully described in the above-cited German Offenlegungsschrift, so only a brief discussion will be provided here. The differential pressure transducer 34 has a first pressure chamber 35 and a second pressure chamber 35, which are separated from one another by a diaphragm 37 secured to the actuation push rod 33. The pressure chambers 35 and 36 are enclosed within a housing 38, which has guides 39 for guiding the actuation push rod 33. For the sake of pressure equalization, each pressure chamber 35, 36 is closed off with respect to atmospheric pressure by a respective diaphragm 40 and 41. The second pressure chamber 36 is connected to a fuel supply line 42, while a branch fuel supply line 43 discharges into the first pressure chamber 35; this branch line 43 branches off from the fuel supply line 42 upstream of a metering cross section or throttle restriction in terms of the direction of fuel supply.

The pressure control valve 10, which is a double-acting plate valve, has an opening hysteresis which orients itself to the pressure difference between the valve interior 14 and the blind bore 24 on the one hand and the pressure difference between the blind bore 24 and the vacuum line 17 on the other, as well as to the initial stress of the valve closing spring 30. To achieve both a regulation of the exhaust recirculation valve which is undisturbed by the pressure control valve 10 and a metering of the exhaust gas feedback rate for delivery to the fuel-air mixture in the intake tube which is correct at all times, it is essential that the opening hysteresis be extremely small. This is attained in that a leakage point 45 which is effective in the valve closing position shown in the drawing is provided between the contact faces of the valve plate 21 and of the valve seat 18 formed by the end face of the vacuum line 17. This leakage location 45 is embodied as a leakage groove 44 extending radially in the contact face of the valve seat 18. In the valve closing position, this leakage groove 44 forms a conduit between the valve opening 19 and the valve interior 14, which extends between the valve seat 18 and the valve plate 21 parallel to the contact faces thereof which rest on one another. Because of this leakage groove 44, the intake pressure prevailing at the underpressure line 17 generates a suction flow between the valve plate 21 and the valve seat 18, causing the generation of a film of air between the contact faces thereof which rest on one another; this film of air prevents the complete closure of this portion of the valve, the so-called vacuum valve, at a static point of the characteristic curve. The same applies to the closure of the ventilation valve 22. There too, because of the suction continuously brought about by the leakage groove 44, an air film forms between the contact face of the valve plate 21 and the further valve seat 25, again preventing a complete closure of the ventilation valve 22. The overall result is that the double-acting plate valve embodied in accordance with the invention has an extremely small opening hysteresis, both in terms of the control of the valve opening 19 discharging into the underpressure line 17 and in terms of the control of the ventilation valve 22 connecting the valve interior with atmospheric pressure.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A valve for gaseous and/or liquid pressure media, in particular a pressure control valve for producing a control pressure of a pressure-medium-actuated exhaust gas recirculation valve in an internal combustion engine, comprising a valve housing, a valve interior in said housing which is exposed to a control pressure to be imposed, a stationary first valve seat which surrounds a first valve opening between a first pressure source and a valve interior exposed to said control pressure to be imposed, a flat valve closing plate that cooperates with said first valve seat which valve closing plate simultaneously forms a valve closing member for a second valve seat located coaxially with said first valve seat and oriented in the same manner as said first valve seat with respect to said valve closing member, in which said second valve seat surrounds a second valve opening between said valve interior and a second pressure source, a valve spring that urges said valve closing member in a closing direction, and a carrier which receives said second valve seat, said carrier being acted upon on one side by a control force which controls said control pressure and on an opposite side by a restoring spring in combination with said control pressure in said valve interior, said carrier being displaceable by a force resulting therefrom and a throttle opening, which is defined by said valve closing plate and said first valve seat which connects said valve interior continuously with the first pressure source.

2. A valve as set forth in claim 1 in which said throttle opening is in the form of a leakage groove that extends radially in said first valve seat.

* * * * *